J. W. DUNN.
DUMPING-WAGON.
No. 175,437.  Patented March 28, 1876.
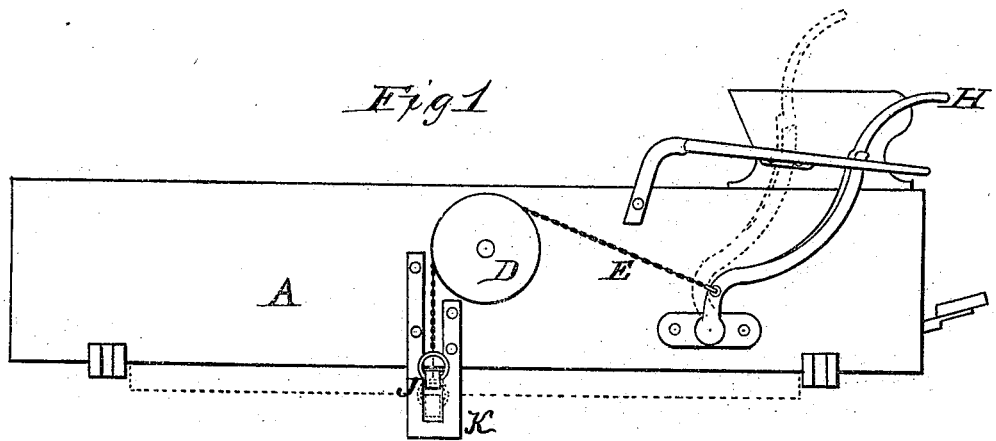
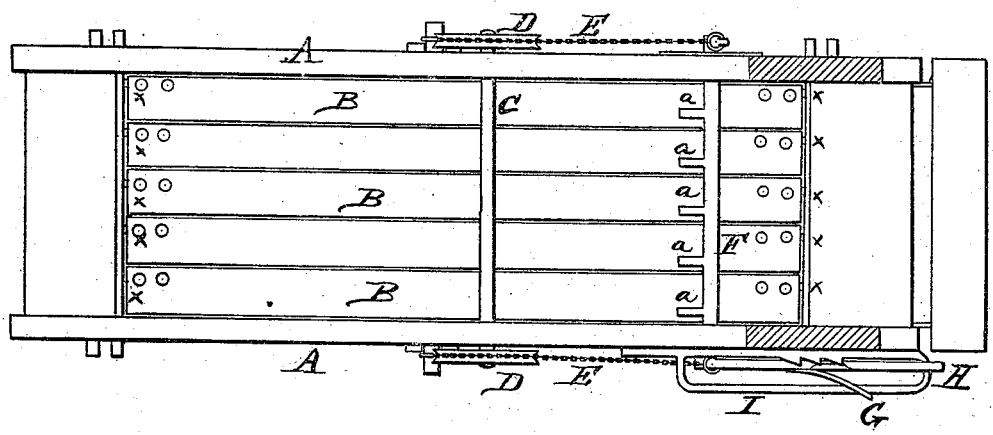
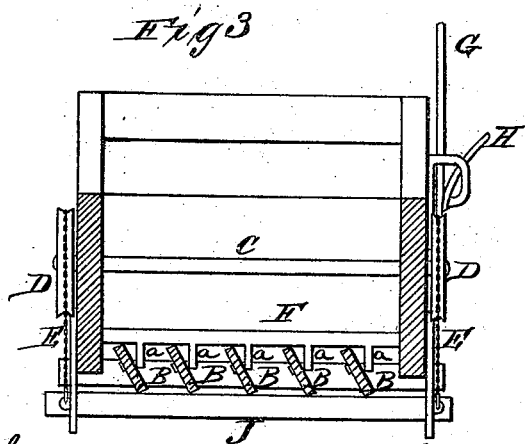
WITNESSES  
INVENTOR

UNITED STATES PATENT OFFICE.

JAMES W. DUNN, OF FRANKLIN, INDIANA.

IMPROVEMENT IN DUMPING-WAGONS.

Specification forming part of Letters Patent No. 175,437, dated March 28, 1876; application filed February 21, 1876

*To all whom it may concern:*

Be it known that I, JAMES W. DUNN, of Franklin, in the county of Johnson and in the State of Indiana, have invented certain new and useful Improvements in Dumping-Wagons; and do hereby declare that the following is a full, clear, and exact description thereof, reference being had to the accompanying drawings, and to the letters of reference marked thereon, making a part of this specification.

The nature of my invention consists in the construction and arrangement of the bottom boards of a dumping-wagon, and in the manner of supporting and operating the same.

In the accompanying drawings making part of this specification, Figure 1 represents a side view, Fig. 2 a plan view, and Fig. 3 a cross-section, of my invention.

In the figures, A represents the body of a dumping-wagon, which may be constructed in any of the well-known and usual ways. B B represent the slats which form the bottom of the body. These slats are pivoted to the body at their ends; but the pivots are placed to one side of the center of slats, so that they will be inclined to turn in one direction of their own gravity. As they will not actually turn of their own gravity without something to start them while there is a load upon them, I run a shaft, F, across the body, and provide this shaft with fingers *a a*, which act upon the long side of the slats when this bar is pressed so that it will partially revolve. Beneath the bottom of the body A is a bar, J. This bar rests in the slots of the metallic hangers K K, said hangers being secured to each side of the body near its center. This bar J rests under the slats, and said slats cannot turn until the bar is lowered. It is regulated—that is, raised and lowered—by means of the chains or cords E E. These chains are fastened to the bar at each of its ends, then pass over pulleys D D on the ends of a shaft, C, and then are attached to arms on the end of shaft F, the lever H being one of these arms. The lever H works within a loop, I, and is pressed against a ratchet-bar by means of a spring, G, so that it can be held in any desired position. The lever H performs two functions—it turns the bar F, so that its fingers start the slats to turn, and at the same time lowers the bar J, so that the slats are allowed to turn, and thus allow the earth or sand to escape from the body. The slats, being hinged off of the center, turn very easily after once being started.

Having thus fully described my invention, what I claim as new, and desire to secure by Letters Patent, is—

1. The slats B B of a dumping-wagon pivoted off of their centers, in combination with the shaft F and its fingers, as and for the purpose set forth.

2. The shaft F, as constructed, and the bar J when connected together and operated simultaneously to start and release the slats B B, as and for the purpose specified.

In testimony that I claim the foregoing I have hereunto set my hand this 31st day of January, 1876.

JAMES W. DUNN,

Witnesses:
R. M. MILLER,
H. C. BARNETT.